(12) United States Patent
Vidyaranya

(10) Patent No.: US 9,224,115 B2
(45) Date of Patent: Dec. 29, 2015

(54) INFORMATION TECHNOLOGY ENERGY WASTAGE MANAGEMENT SYSTEM

(71) Applicant: Infosys Limited, Bangalore (IN)

(72) Inventor: Vishwas Vidyaranya, Bangalore (IN)

(73) Assignee: Infosys Limited, Bangalore (IN)

( * ) Notice: Subject to any disclaimer, the term of this patent is extended or adjusted under 35 U.S.C. 154(b) by 442 days.

(21) Appl. No.: 13/900,404

(22) Filed: May 22, 2013

(65) Prior Publication Data
US 2013/0317877 A1 Nov. 28, 2013

(30) Foreign Application Priority Data
May 23, 2012 (IN) .......................... 2052/CHE/2012

(51) Int. Cl.
*G06Q 10/00* (2012.01)
*G06Q 10/06* (2012.01)

(52) U.S. Cl.
CPC ............................... *G06Q 10/06314* (2013.01)

(58) Field of Classification Search
CPC .............. G06Q 10/039; G06Q 10/063; G06Q 10/06395
USPC .......................................................... 705/7.24
See application file for complete search history.

(56) References Cited

U.S. PATENT DOCUMENTS

| | | | |
|---|---|---|---|
| 5,344,068 A | 9/1994 | Haessig | |
| 7,506,366 B1 | 3/2009 | Sze et al. | |
| 8,880,925 B2* | 11/2014 | Chang | F24D 19/1048 713/340 |
| 2002/0178387 A1* | 11/2002 | Theron | G06F 1/32 713/300 |
| 2009/0240380 A1 | 9/2009 | Shah et al. | |
| 2010/0058093 A1 | 3/2010 | Danieli et al. | |
| 2010/0077241 A1* | 3/2010 | Piazza | G06F 1/3209 713/320 |
| 2010/0161149 A1* | 6/2010 | Nguyen | G06F 1/266 700/296 |
| 2010/0295474 A1* | 11/2010 | Chemel | H05B 37/0272 315/294 |
| 2010/0328314 A1* | 12/2010 | Ellingham | G06Q 50/06 345/440 |
| 2011/0071952 A1* | 3/2011 | Gaffney | G06Q 30/018 705/317 |
| 2012/0259466 A1* | 10/2012 | Ray | G05B 15/02 700/275 |
| 2012/0277924 A1* | 11/2012 | Kobayashi | G06Q 10/06 700/291 |
| 2013/0066479 A1* | 3/2013 | Shetty | G01D 4/002 700/295 |

OTHER PUBLICATIONS

"Cisco EnergyWise Technology," Cisco web site, http://www.cisco.com/en/US/products/ps10195/index.html#, visited Mar. 28, 2012, 2 pages.
Faronics "Power Save Enterprise," Faronics web site www.faronics.com, visited Mar. 28, 2012, 8 pages.
"NightWatchman Enterprise," 1E website, www.1e.com, visited Mar. 28, 2012, 6 pages.
"PC Power Management Product Tour," Verdiem web site, http://www.verdiem.com/pc-power-management-product-tour, visited Mar. 28, 2012, 2 pages.
"Surveyor 6 Product Guide," Verdiem web site, downloaded Mar. 28, 2012, 6 pages.

* cited by examiner

*Primary Examiner* — Thomas L Mansfield, Jr.
(74) *Attorney, Agent, or Firm* — Klarquist Sparkman, LLP

(57) ABSTRACT

Various technologies related to managing energy wastage management in the information technology (IT) domain are described. Implementation of the described features can lead to considerable energy savings for organizations having significant information technology hardware. Attendance information from various sources can be incorporated into the system. Power state information from a lightweight client running at nodes can also be incorporated. Wastage results can be generated and provided to encourage reduction of wastage. Enforcement of wastage policies can also be implemented. Monitoring can be done on an individual, department, or campus-wide level. Management can be accomplished in many cases without having to invest in specialized sensors or other costly infrastructure.

15 Claims, 20 Drawing Sheets

| Day | Status* | GI* (Gate In) | GO* (Gate out) | Total energy(Wh) |
|---|---|---|---|---|
| 21-Dec-2011 | Out of campus | 8:00 | 20:00 | 280 |
| 22-Dec-2011 | Out of campus | 10:00 | 19:30 | 700 + 315 = 1015 |
| 23-Dec-2011 | Out of campus | 8:00 | 18:00 | 560 + 420 = 980 |
| 24-Dec-2011 | Weekly off | - | - | 1680 |
| 25-Dec-2011 | Weekly off | - | - | 1680 |
| 26-Dec-2011 | Out of campus | 9:00 | 21:30 | 630 + 175 = 805 |
| 27-Dec-2011 | Out of campus | 9:00 | 20:00 | 630 + 280 = 910 |
| 28-Dec-2011 | Out of campus | 8:00 | 20:00 | 560 + 280 = 840 |
| 29-Dec-2011 | Out of Campus | 9:00 | 21:00 | 630 + 210 = 840 |
| 30-Dec-2011 | Out of Campus | 10:30 | 17:30 | 735 + 455 = 1190 |

| Total no. of days* | Avg. Working hours* | Total Energy wasted(KWh) | Total cost |
|---|---|---|---|
| 10 | 10.75 | 10.22 | 61.32 Rs. |

1500

1600

INFORMATION TECHNOLOGY ENERGY WASTAGE MANAGEMENT SYSTEM

BACKGROUND

Energy is the prime requirement for the survival of our civilization. Energy conservation has become a strategic goal for many organizations as the world realizes that current energy consumption trends are unsustainable. As organizations attempt to find ways to conserve energy, attention has turned to the information technology sector.

Various approaches have already resulted in great advances in the field of information technology energy conservation. For example, various computer equipment can enter a sleep or low-power consumption mode when not used over a certain amount of time. Separately, computer monitors have evolved from cathode ray tubes to low-power LCD or LED displays. Computer users remind each other that saving energy is important.

Although various approaches have been taken to address energy conservation, there is still a need to provide technologies for still greater advances.

SUMMARY

A variety of techniques can be used for implementing energy wastage management in the information technology (IT) domain. Energy wastage by personal computer users can be monitored and addressed as described herein.

Attendance data from various sources can be incorporated into the system.

A lightweight client at personal computers can forward data to a host system, which can provide wastage results.

A rich set of features can be supported, including non-real-time data processing, non-digital data sources, avoidance of network congestion, sensor-less operation, and the like.

As described herein, a variety of other features and advantages can be incorporated into the technologies as desired.

The foregoing and other features and advantages will become more apparent from the following detailed description of disclosed embodiments, which proceeds with reference to the accompanying drawings.

BRIEF DESCRIPTION OF THE DRAWINGS

FIG. 15 is an exemplary user interface displaying a chart of energy wastage activity details.

DETAILED DESCRIPTION

Example 1

Exemplary Overview

The technologies described herein can be used for a variety of information technology energy wastage management scenarios. Adoption of the technologies can provide an efficient technique for determining the amount of energy wastage involving various information technology hardware nodes.

The technologies can be helpful to those wishing to improve (e.g., reduce) energy wastage. Beneficiaries include organizations who have a large population of information technology users. Users can also greatly benefit from the technologies because they move the organization toward more sustainable energy consumption practices that benefit everyone.

Example 2

Exemplary System Employing a Combination of the Technologies

Figure 1:
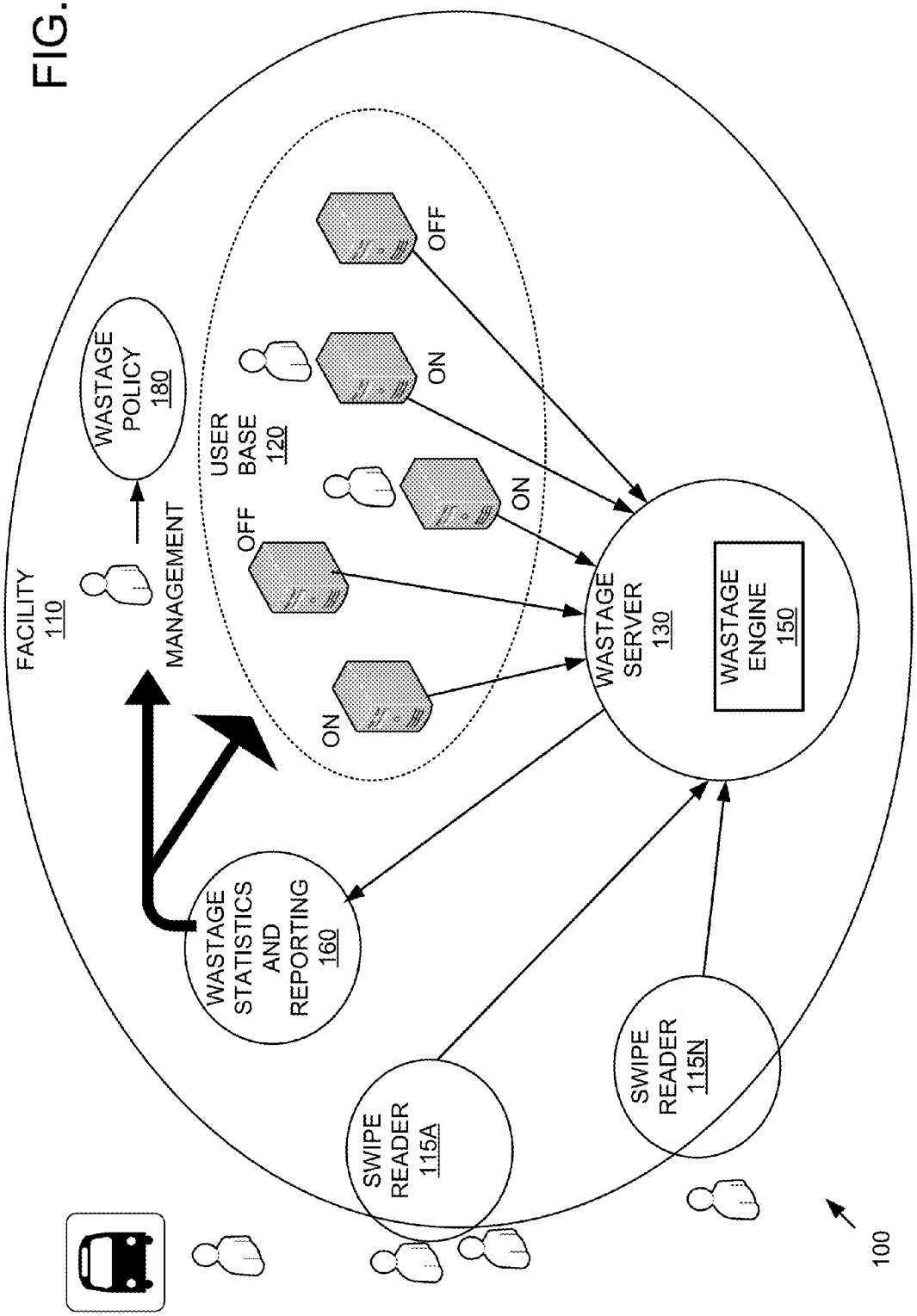
FIG. 1 is a block diagram of an exemplary environment for an exemplary system implementing the information technology energy wastage management technologies described herein.

FIG. 1 is a block diagram of an exemplary environment 100 for an exemplary system implementing the information technology energy wastage management technologies described herein. In the example, a facility 110 is entered via entryways having swipe readers 115A-N. A user base 120 has users who use various computing device hardware nodes that report power state information to a wastage server 130.

In practice, the swipe readers 115A-N can communicate with an intermediary system that batches information and communicates it to the wastage server 130.

The server 130 executes a wastage engine 150, which generates wastage metrics, wastage statistics, and reporting 130, which can be directed to the user base 120 and/or management. Management can consider the information 160 to generate a wastage policy 180. The wastage policy 180 can be used as input by the wastage engine 150 when generating future information 160.

In practice, actual implementations can be of differing complexity. For example, a large organization may have thousands of employees in a facility, and information for multiple facilities can be aggregated as described herein.

Example 3

Exemplary System Employing a Combination of the Technologies

Figure 2:
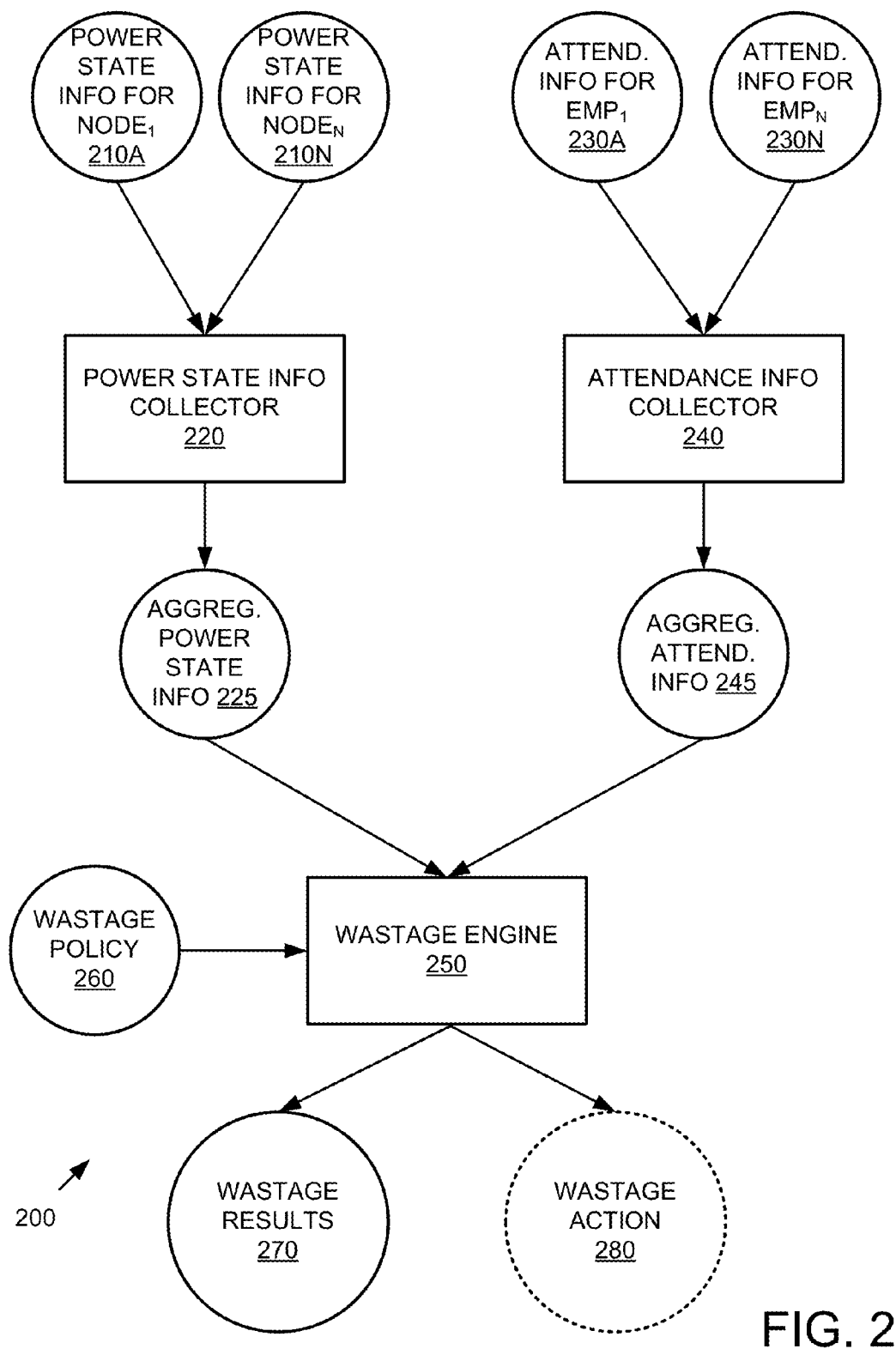
FIG. 2 is a block diagram of an exemplary system implementing the information technology energy wastage management technologies described herein.

FIG. 2 is a block diagram of an exemplary system 200 implementing the information technology energy wastage management technologies described herein. In the example, one or more computers in a computing environment implement energy wastage engine 250 that accepts as input aggregated hardware node power state information 225.

Power state information 210A-N for respective hardware nodes (e.g., generated as described herein) is collected by a power state information collector 220, which generates the aggregated hardware power state information 225 based on the information 210A-N.

Attendance information 230A-N for respective users (e.g., generated as described herein) is collected by an attendance information collector 240, which generates the aggregated user attendance information 245.

The collector 220, the collector 240, and the engine 250 may execute on the same or different machines.

As described herein, the wastage engine 250 can handle a variety of wastage scenarios based on the inputs and generate energy wastage results 270. Policies 260 can influence calculations, and one or more wastage actions 280 can also be generated.

In practice, the systems shown herein, such as system 200 can be more complicated, with additional functionality, more complex inputs, and the like.

In any of the examples herein, the inputs, outputs, collectors, and engines can be stored in one or more computer-readable storage media or computer-readable storage devices.

Example 4

Exemplary Method of Applying a Combination of the Technologies

Figure 3:
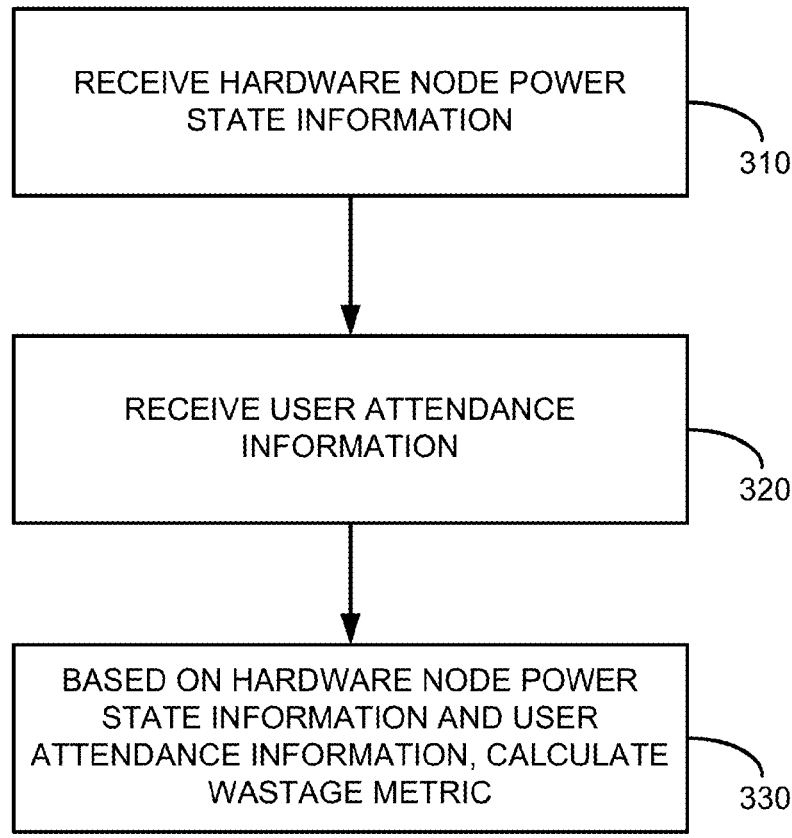
FIG. 3 is a flowchart of an exemplary method of implementing the information technology energy wastage management technologies described herein.

FIG. 3 is a flowchart of an exemplary method 300 of implementing the information technology energy wastage management technologies described herein and can be implemented, for example, in a system such as that shown in FIG. 2. The technologies described herein can be generic to the specifics of operating systems or hardware and can be applied in any variety of environments to take advantage of the described features.

At 310, hardware node power state information is received. Such information can include an indication of a time and a power state for a hardware node. For example, the information can indicate a time when the node was powered on, a time when the node was powered off, and the like, as described herein.

At 320, user attendance information is received. Such attendance information can include an indication of a time when a user entered the facility, an indication of a time when a user left the facility, and the like, as described herein. Attendance information can be batched with attendance information for other users as described herein.

At 330, based on the hardware node power state information and the user attendance information, a wastage metric is calculated (e.g., for the user). For example, if the information indicates that a user was absent but a hardware node was left on by the user, wastage is indicated. Parameters and policies can control how wastage is calculated, allowing for brief absences, and the like.

An amount of time when the hardware node was left on and the user was absent can be determined. Calculating the wastage metric can incorporate the amount of time as wastage. Other factors (e.g., the amount of energy consumed by the hardware node during the time, the cost of a unit of energy, and the like) can be incorporated into metric calculation.

The method 300 and any of the methods described herein can be performed by computer-executable instructions stored in one or more computer-readable media (e.g., storage or other tangible media) or stored in one or more computer-readable storage devices.

Example 5

Exemplary Network Connections

The technologies described herein can implement communications between hardware using a variety of networks and network protocols, including for example wired and wireless networks, Internet Protocol, open protocols, proprietary protocols, legacy infrastructure, legacy protocols, and the like.

For example, entryway swipe readers can communicate directly with a wastage engine, or they can rely on communicating through a legacy or independent security system network and/or a security system server that in turn communicates with the wastage engine.

Example 6

Exemplary Deferral of Information Transmittal

In any of the examples herein, information (e.g., attendance information, power state information, or the like) transmission can be deferred. For example, when attendance information is collected for a plurality of employees (e.g., by an attendance information collector), it can be stored together. Subsequently, responsive to determining that network traffic conditions are light, the information can be sent as a batch (e.g., from a time-and-attendance system to the wastage server).

Network traffic conditions can be determined as light according to time of day (e.g., off hours, light hours, or the like), monitoring traffic, or querying a server.

Thus, transmission of user attendance information (e.g., by a time-and-attendance system) can be deferred until network conditions are light, and responsive to determining that network conditions are light, the user attendance information can be transmitted.

Such non-real-time batch processing can be useful for avoiding network congestion. For example, data can be transmitted to the energy wastage server during non-peak hours. Thus, the technologies need not affect network traffic during peak load times.

Example 7

Exemplary Power States

In any of the examples herein, a power state can indicate the power state of a hardware machine (e.g., powered on, turned off, hibernating, sleeping, etc.). In practice, other states (e.g., log-in state) can be used as a proxy for power state as appropriate.

The power state can also be accompanied by a user identifier (e.g., a login name, user name, or the like).

Example 8

Exemplary Hardware Nodes

In any of the examples herein, a node can be a hardware computing device, such as a personal (e.g., desktop) computer, laptop, or other computer-related device used within organization. In practice, such nodes have a processor and memory, allowing them to execute the lightweight client described herein to monitor node power state.

When calculating energy wastage, the amount of power consumed by accompanying hardware (e.g., monitors) can be included in calculations.

Example 9

Exemplary Sensor-free Aspects

In any of the examples herein, the energy wastage management system can implement a sensor-free approach to collecting node power state information. For example, instead of requiring a sensor to monitor the power state of a node, a lightweight client can execute at the node and provide power state information to a wastage management server.

Example 10

Exemplary Wastage Management Server

In any of the examples herein, wastage metrics can be calculated via an energy wastage management server. In practice, such a server can be implemented on a single server. However, virtualization, load balancing, and other techniques can result in spreading the server over plural machines.

Example 11

Exemplary Non-real-time Aspects

In any of the examples herein, attendance data can be collected on a non-real-time basis. For example, attendance data may not be available on the network immediately after collection. Instead, such attendance data may be batched (e.g., at the end of day, shift, or other period) and sent in groups for consumption when calculating wastage metrics (e.g., by the energy wastage management server).

Receiving user attendance information can thus comprise receiving batched information for a plurality of users that entered or departed a facility over the observed time period.

Example 12

Exemplary Attendance Information

In any of the examples herein, attendance information can take a variety of forms. In initial form, attendance information typically takes the form of a time and an event type (e.g., gate-in and gate-out events). The time can indicate a time, date, or both of the event. An employee identifier (e.g., name or id number) can also be associated with the event.

Attendance information can be pre-processed to indicate a date, employee identifier, time in, and time out.

Example 13

Exemplary Non-Digital Attendance Information

In any of the examples herein, the attendance data can originate in non-digital form. In such a case, attendance data can be received via manual entry.

For example, a physical paper attendance book may be used in the system by which an employee signs in and signs out of the attendance book (e.g., at a security gate). Entries in the physical attendance book can be manually entered into a computer system that transmits the data to the wastage engine for analysis. Manually entered data can be mixed with data originating in digital format (e.g., from card swipes).

Example 14

Exemplary Card Swiper

In any of the examples herein, a card swiper can take the form of an electronic device that can detect card swipes, badge presentations, or the like. Such hardware can use optical, RF, RFID, near field communications, magnetic, or other technology to acquire a user identifier from the card or badge. A system clock can track the date and time and accompany the user identifier with a timestamp.

Whether the swipe is considered an arrival or departure can be dependent on the swiper location (e.g., at entry or exit), time of day, switchable (e.g., the swiper can process both arrivals and departures), or the like.

Example 15

Exemplary Wastage Metrics

In any of the examples herein, wastage metrics can take a variety of forms indicating wastage of energy. Such metrics typically indicate energy that could have been saved if a hardware node had not been left turned on (e.g., had been turned off or placed in hibernation) when a user was absent (e.g., as indicated by attendance information).

Metrics can indicate a percentage, amount of time energy was wasted (e.g., a node was left on when absent), amount of energy wasted (e.g., in watt-hours), amount of money wasted (e.g., in currency), or the like.

Metrics can also indicate how well a goal was met, how much improvement was observed, or the like.

Figure 13:
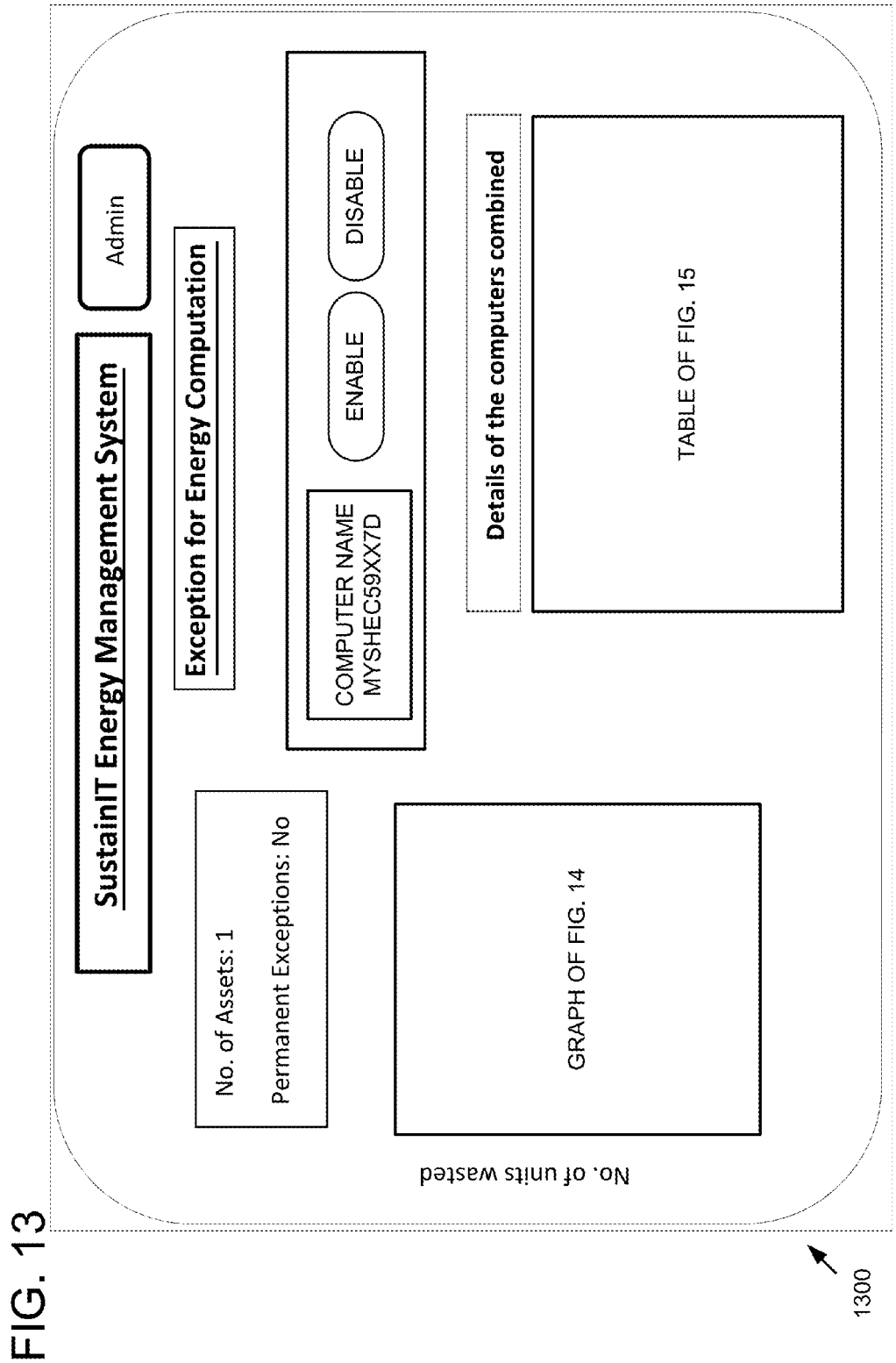
FIG. 13 is a screen shot of an exemplary client user interface of an energy wastage management system.
Figure 14:
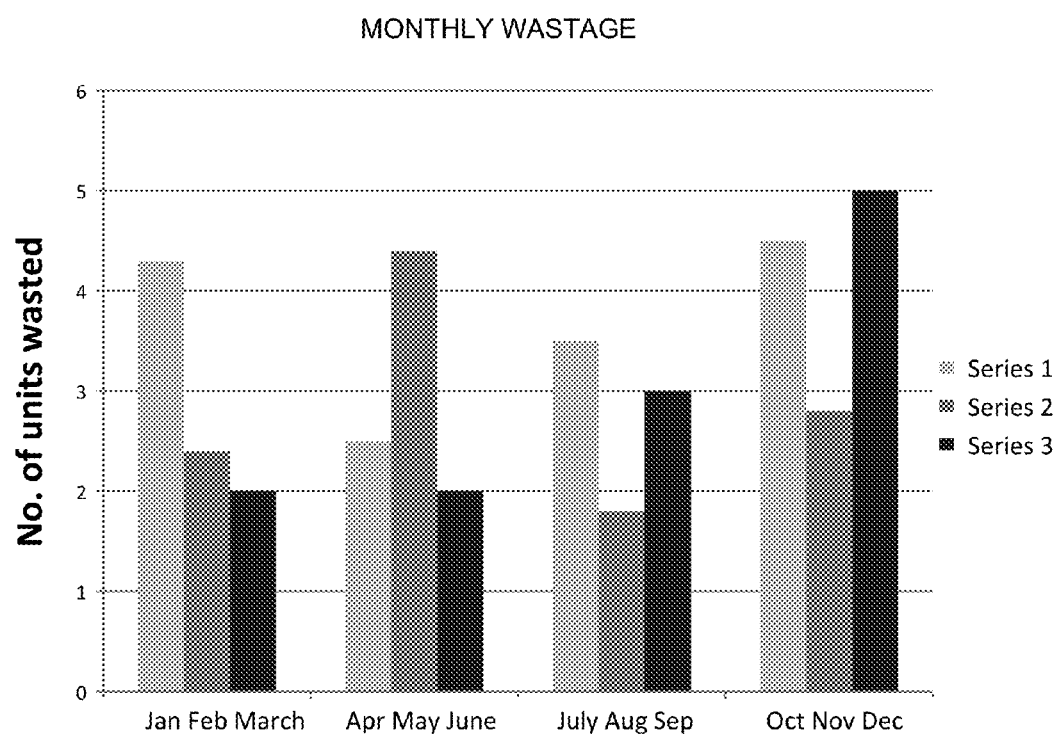
FIG. 14 is a screen shot of an exemplary user interface displaying energy wastage data for a particular user.
Figure 17:
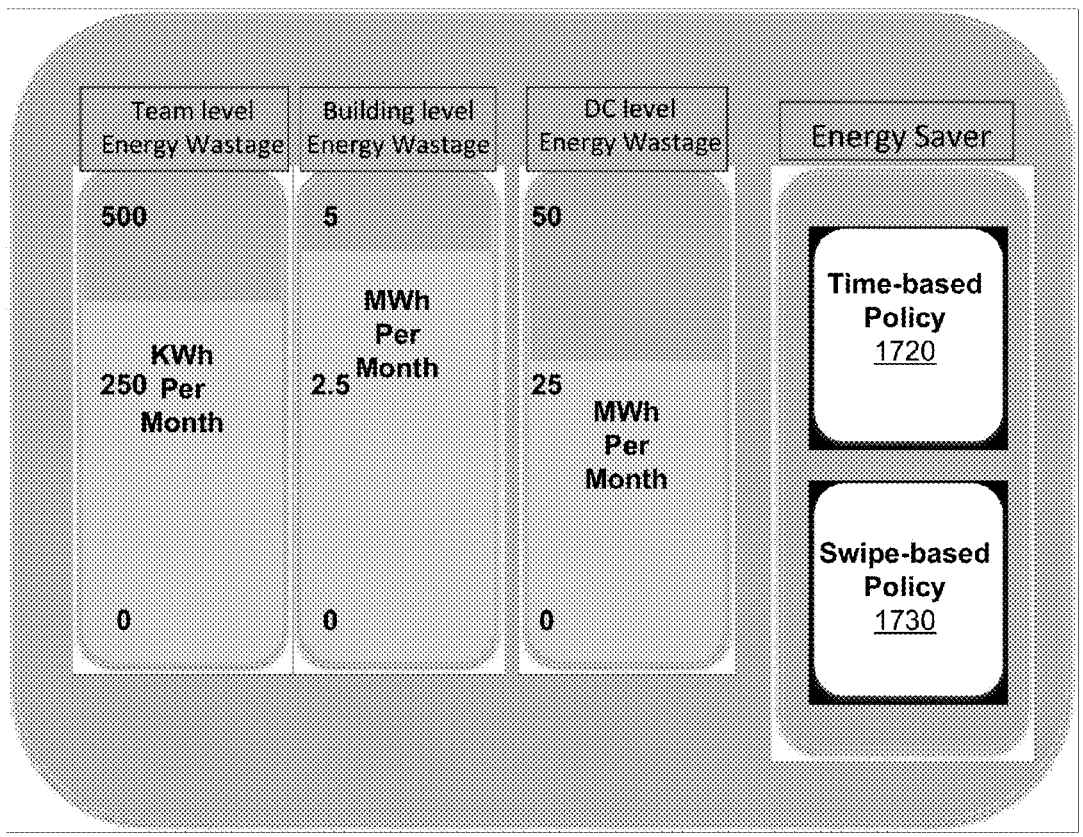
FIG. 17 is a screen shot showing an exemplary administrator user interface for monitoring team-, building-, and campus-level energy wastage and for setting energy wastage policies.

Examples of wastage metrics displayed appear in FIGS. 13, 14, and 17.

Example 16

Exemplary Wastage Engine

Figure 4:
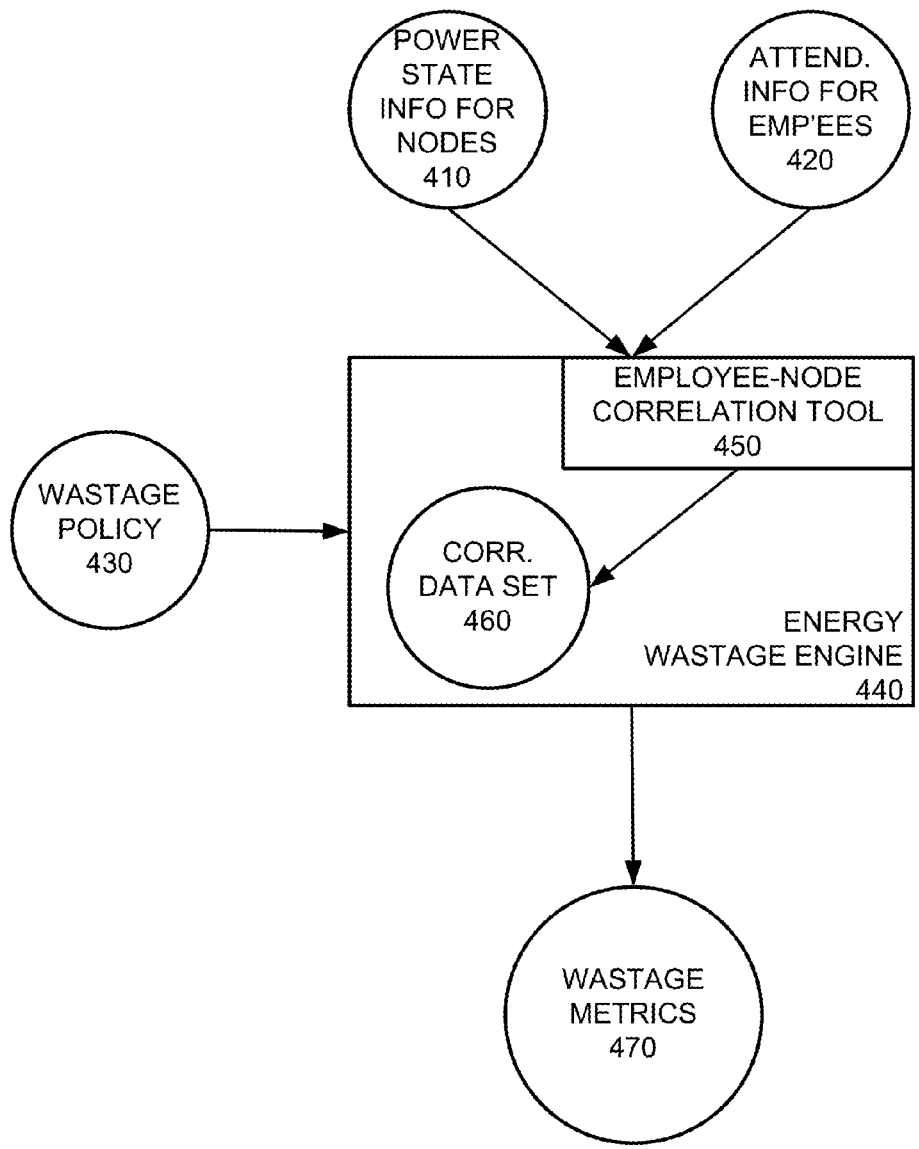
FIG. 4 is a block diagram of an exemplary system determining energy wastage results via an energy wastage engine.

FIG. 4 is a block diagram of an exemplary system determining energy wastage results via an energy wastage engine

440. In the example, the energy wastage engine 440 accepts power state information 410 for hardware nodes and attendance information 420 for employees as input and generates wastage metrics 470 as output.

An energy wastage policy 430 can influence energy wastage calculations as described herein. The engine 440 can include an employee-node correlation tool 450 that generates one or more correlated data sets 460.

The wastage correlated data set 460 can be acted upon using rules and parameters of the energy wastage management policy 430 to generate wastage metrics 470. Wastage actions can also be generated therefrom.

Example 17

Exemplary Method of Determining Wastage

Figure 5:
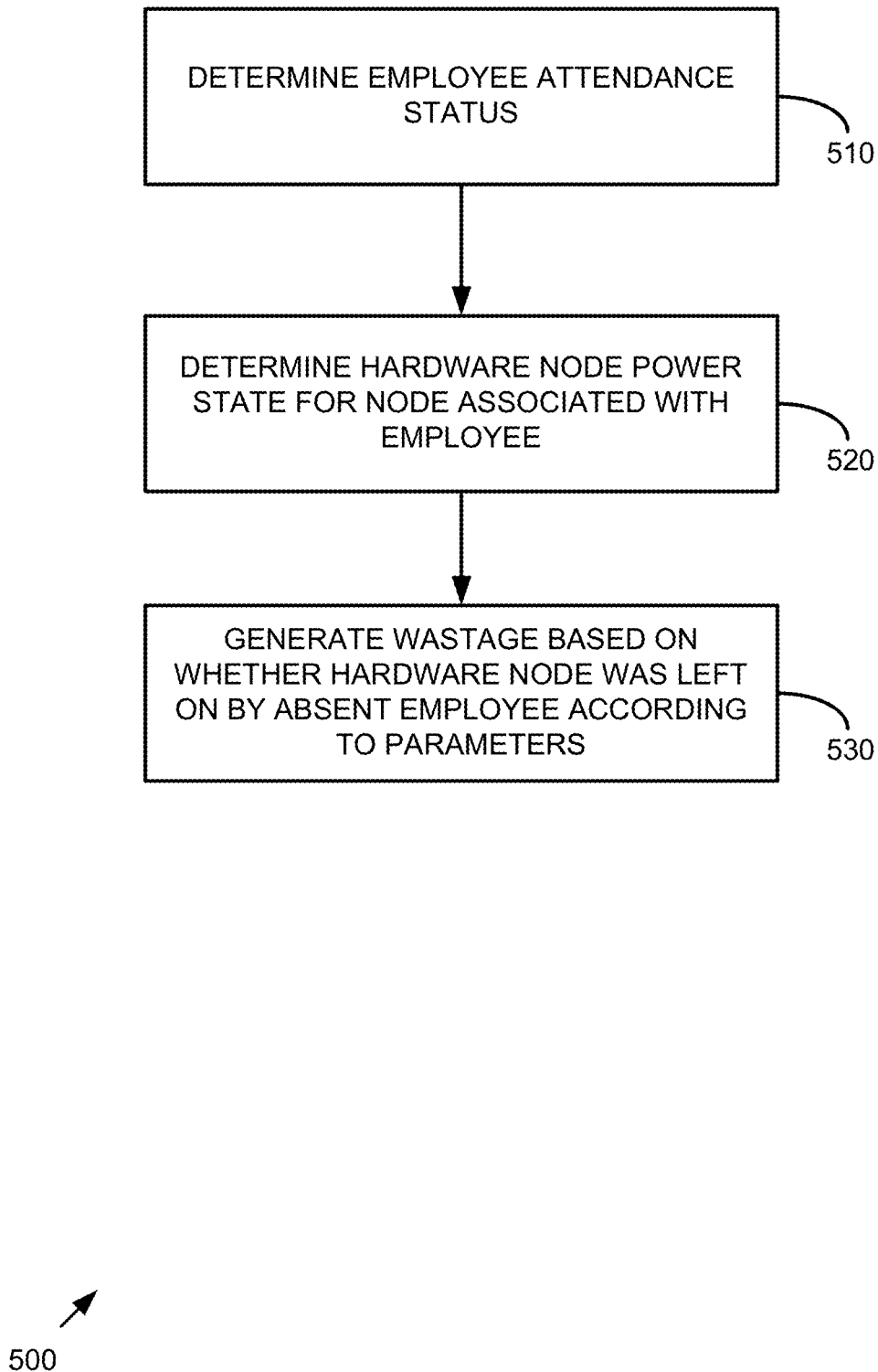
FIG. 5 is a flowchart of an exemplary method of determining energy wastage based on whether a hardware node was left on by an absent user.

FIG. 5 is a flowchart of an exemplary method of determining energy wastage based on whether a hardware node was left on by an absent user.

At 510, the attendance status of an employee is determined. As described herein, it can be determined whether an employee has arrived or departed a facility and the times associated therewith. For example, a determined time range of when the employee was present can be determined.

At 520, the hardware node power state of a hardware node associated with the employee can be determined. As described herein, it can be determined whether a hardware node has been powered on or off. For example, a determined time range of when the hardware node was powered on can be determined. The range can be based on (e.g., limited to) a particular observation period (e.g., day, week, month, or the like).

At 530, an energy wastage determination can be generated based on whether the hardware node was left powered on by an absent employee according (e.g., according to parameters in the energy wastage management policy). Ranges of time when the hardware node was powered on but the employee was not present can be considered waste (e.g., subject to opt-out conditions, policies, and the like). Correlation between a user and an employee (e.g., to determine that they are the same person) can be performed.

Example 18

Exemplary System Correlating Information

Figure 6:
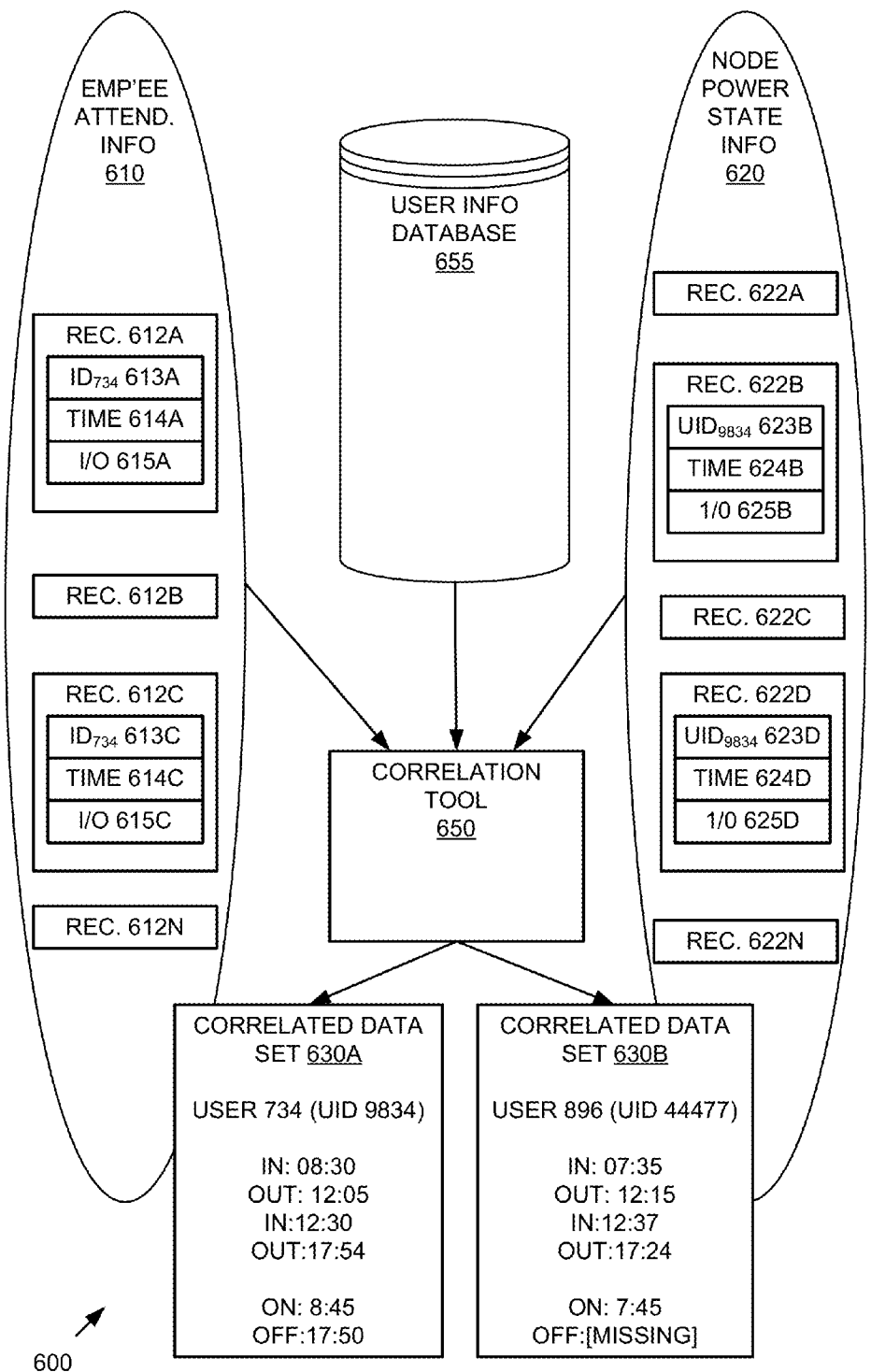
FIG. 6 is a block diagram of an exemplary system correlating employee attendance information and hardware power state information.

FIG. 6 is a block diagram of an exemplary system 600 correlating employee attendance information 610 and hardware power state information 620.

In the example, the employee attendance information 610 comprises attendance records 612A-N. A record 612A can have respective fields for employee identifier 613A, timestamp 614A, and in-or-out indication 615A. Another employee attendance record 612C can match the record 612A (e.g., have the same employee identifier 613A, 613C). In practice, the data can be of a different format (e.g., a record can indicate both in and out times, if any).

The node power state information 620 can comprise node power state records 622A-622N generated as described herein. A record 622B can have respective fields for user identifier 623B (e.g., computer user name), a time stamp 624B, and on-or-off indication 625B. Another hardware node power state record 622D can match the record 622B (e.g., have the same user identifier 623B, 623D). In practice, the data can be of a different format (e.g., a record can indicate both on and off time, if any).

The correlation tool 650 can rely on the user information database (e.g., that correlated employee identifiers in the attending information 610 with user identifiers in the node power state information 620) to correlate employee identifiers with user identifiers.

The correlation can result in correlated data sets 630A-B. In the example, a data set indicates in and out times as well as on and off times for a particular employee (e.g., which can be tracked by employee identifier, user identifier, or both).

In practice, correlation can be done in a variety of ways. For example, instead of tracking multiple in and out times as shown, a first and last attendance event per employee can be tracked per day (e.g., a first and last swipe of the day).

Energy wastage is indicated by times detected when the hardware node is powered on but the employee is absent. For example, for correlated data set 630B, the time after 17:24 for user 896 is considered wastage, subject to policy considerations, opt out conditions, and the like. In a day-by-day calculation, wastage can be calculated until midnight.

Power state information can be preserved for future reference. For example, when the user 896 returns to work the next day, the hardware node can still be considered powered on and wastage accumulates until the employee returns to the work facility.

Example 19

Exemplary Method of Correlation

Figure 7:
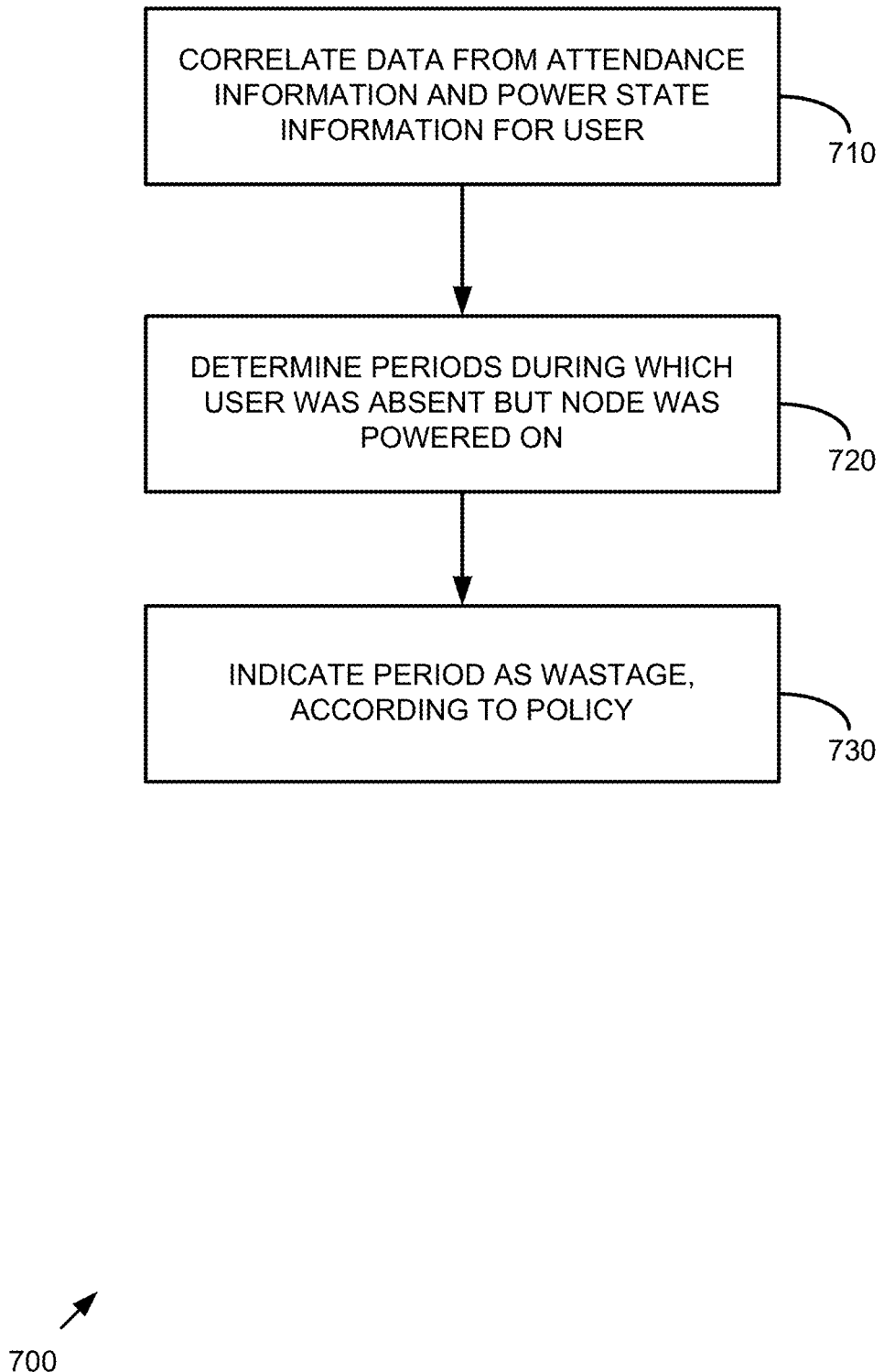
FIG. 7 is a flowchart of an exemplary method of correlating employee attendance information and hardware power state information.

FIG. 7 is a flowchart of an exemplary method 700 of correlating employee attendance information and hardware power state information.

At 710, data from employee attendance information and data from hardware node power state information are correlated for a user.

At 720, periods during which the user was absent but the node was powered on are determined.

At 730, such periods are indicated as wastage, subject to any energy wastage management policies.

Example 20

Exemplary Lightweight Program

Figure 8:
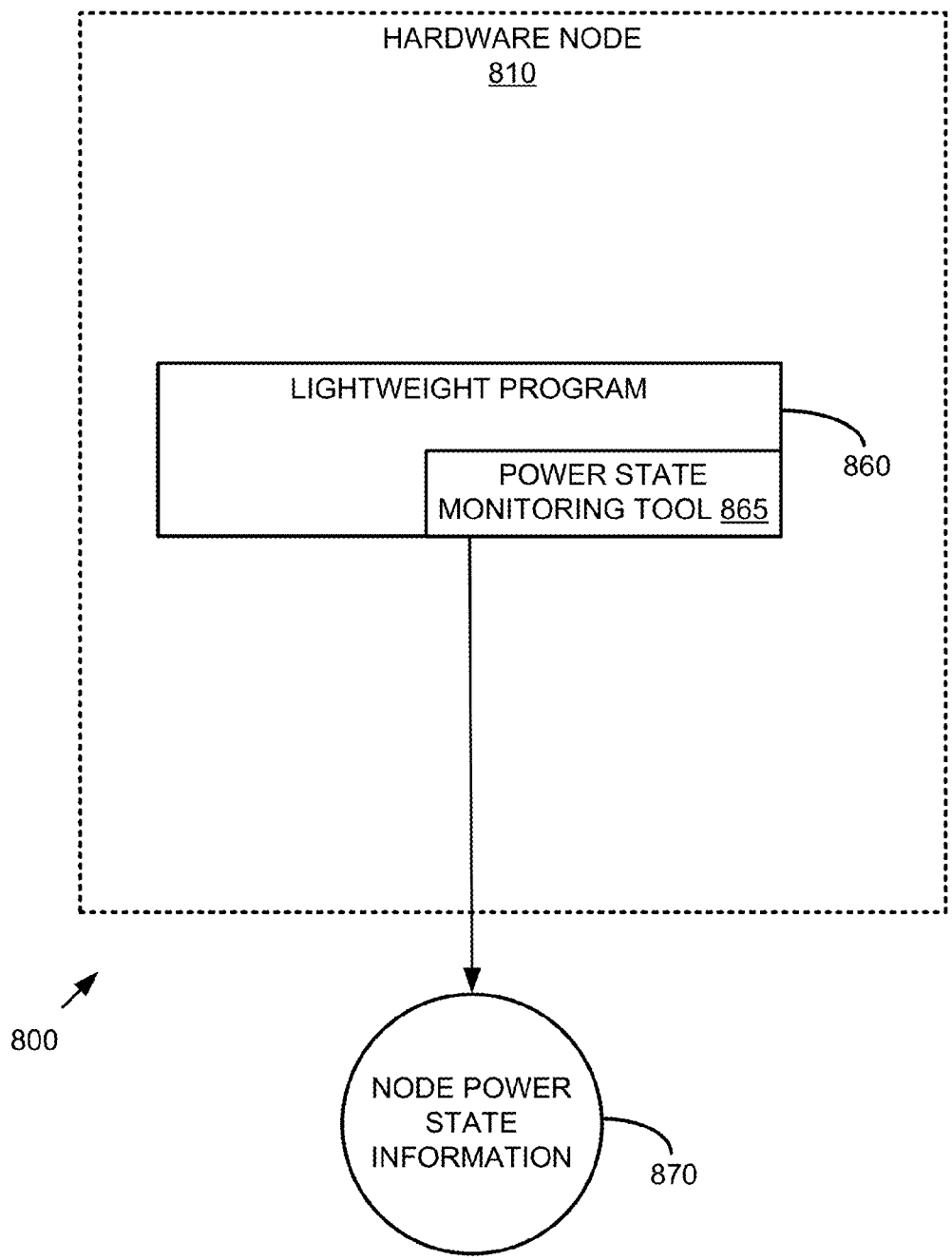
FIG. 8 is a block diagram of an exemplary system executing a lightweight program at a hardware node to provide node power state information.

FIG. 8 is a block diagram of an exemplary system 800 executing a lightweight program 860 at a hardware node 810 to provide node power state information 870.

In the example, the program 860 includes a power state monitoring tool 865 that can track the power state of the hardware node 810.

The hardware node power state information can take the form of a log that indicates timestamps and events. The identity of the node 810 can be shown in the log or obtained implicitly (e.g., because it is sent by the hardware node 810).

The information 870 can be sent to an energy wastage management server that processes the information 870 to determine wastage. The information can be held and sent in batches (e.g., as log entries) rather than sent immediately. The server need not ping the hardware node 810 because the tool 865 can reliably determine the power state of the node 810 (e.g., via logins, logouts, shutdowns, power ups, and the like).

The lightweight program 860 can also receive incoming messages if desired (e.g., to reset parameters, implement forced power down, and the like).

A client program can also be run at the hardware node 810 to present more comprehensive information about wastage.

Example 21

Exemplary Method of Generating Node Power State Information

Figure 9:
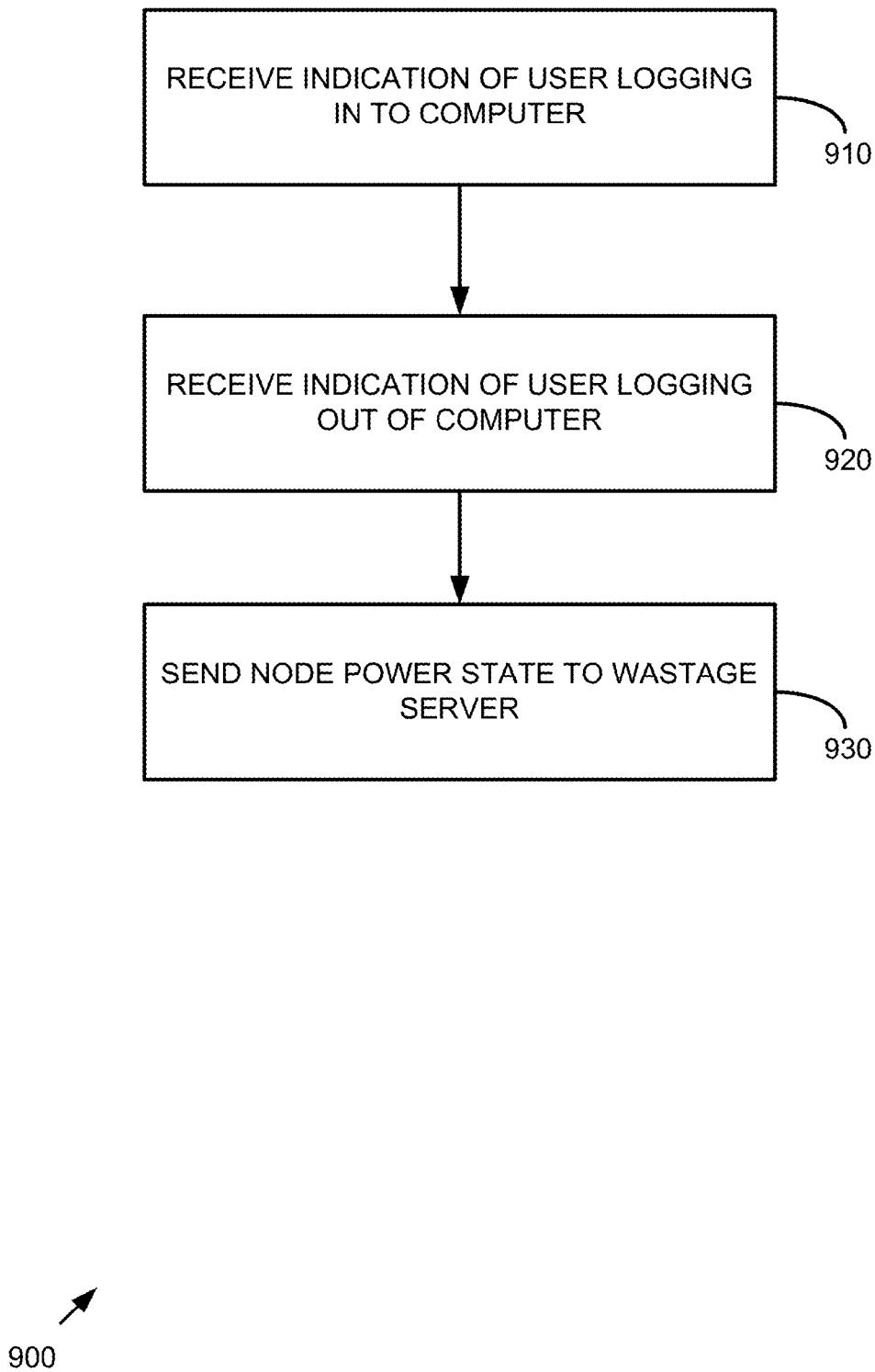
FIG. 9 is a flowchart of an exemplary method of generating node power state information at the node level.

FIG. 9 is a flowchart of an exemplary method 900 of generating hardware node power state information at the node level.

At 910, an indication of a user logging in to the node is received. A log entry can be made to indicate that the node is powered on.

At 920, an indication of a user logging out of the node is received. A log entry can be made to indicate that the node is powered off.

At 930, the node power state information (e.g., in the log) is sent to an energy wastage management server.

Example 22

Exemplary Policies

In any of the examples herein, energy wastage management policies can be understood and implemented by software. For example, a policy may state the amount of time that is allotted for lunch breaks, how long an employee may be away from a hardware node before it is shut down, a time of day at which nodes are automatically shut down (e.g., if not attended) and the like.

Other policy information can indicate which events are reported to management, what penalties, credits, and rewards are assigned, and the like.

Other policy information can include cost per unit of energy wasted, assumed amount of energy consumed by a hardware node, and the like.

Example 23

Exemplary Goal Monitoring System

Figure 10:
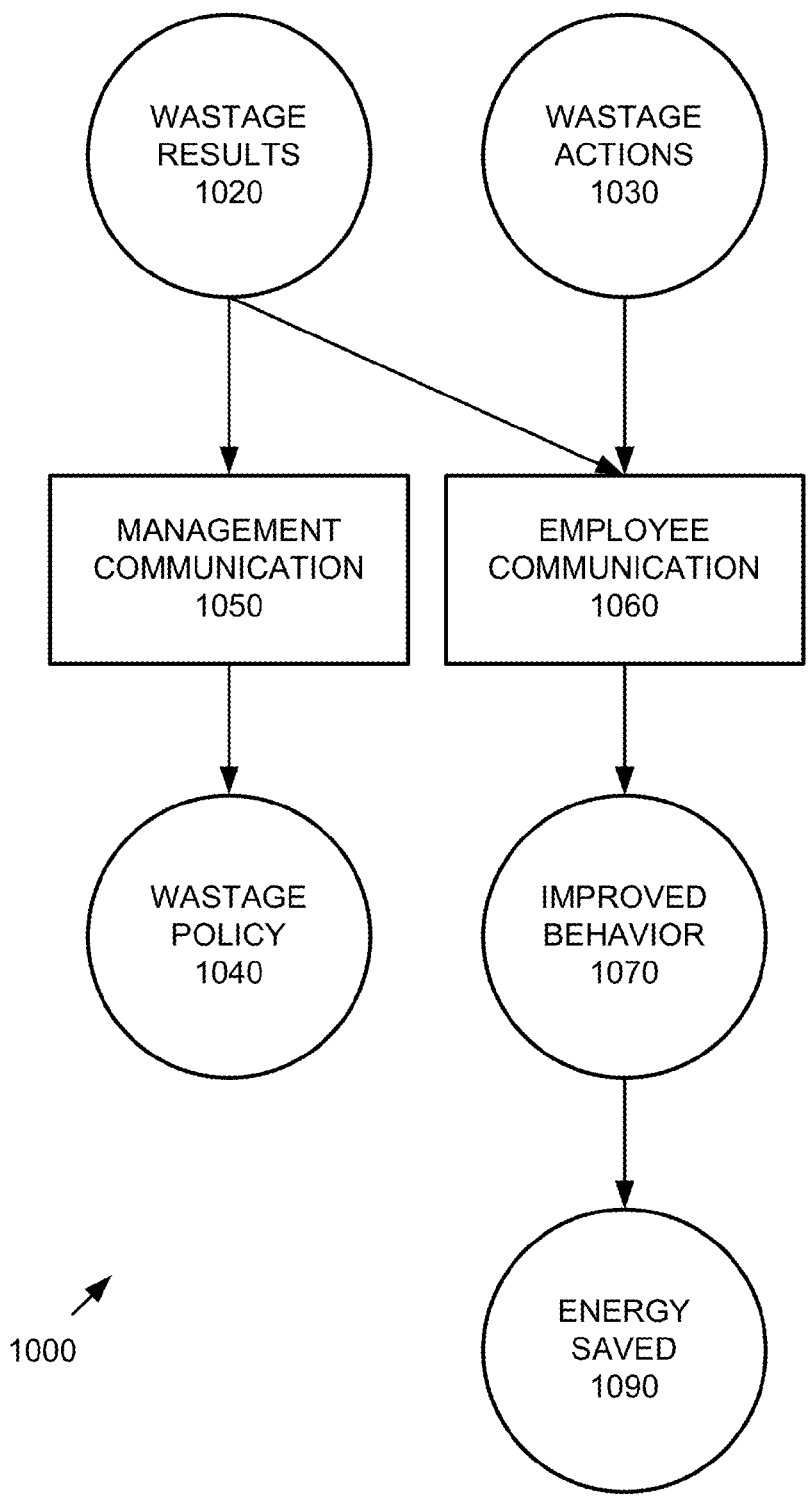
FIG. 10 is a block diagram of an exemplary system monitoring energy via assessment of wastage results, encouraging improved energy consumption behavior by users, and ultimately saving energy.

FIG. 10 is a block diagram of an exemplary system monitoring energy via assessment of wastage results, encouraging improved energy consumption behavior by users, and ultimately saving energy.

Energy wastage measurement results 1020 can impact communications to management 1050 and communications to employees 1060. Wastage actions can also influence communications to employees 1060.

Management can develop energy wastage management policies 1040 to be used in concert with the energy wastage management system described herein. Employees can adopt improved behavior 1070 (e.g., not leaving computers on overnight), resulting in energy saved 1090.

Example 24

Exemplary Goal Monitoring Method

Figure 11:
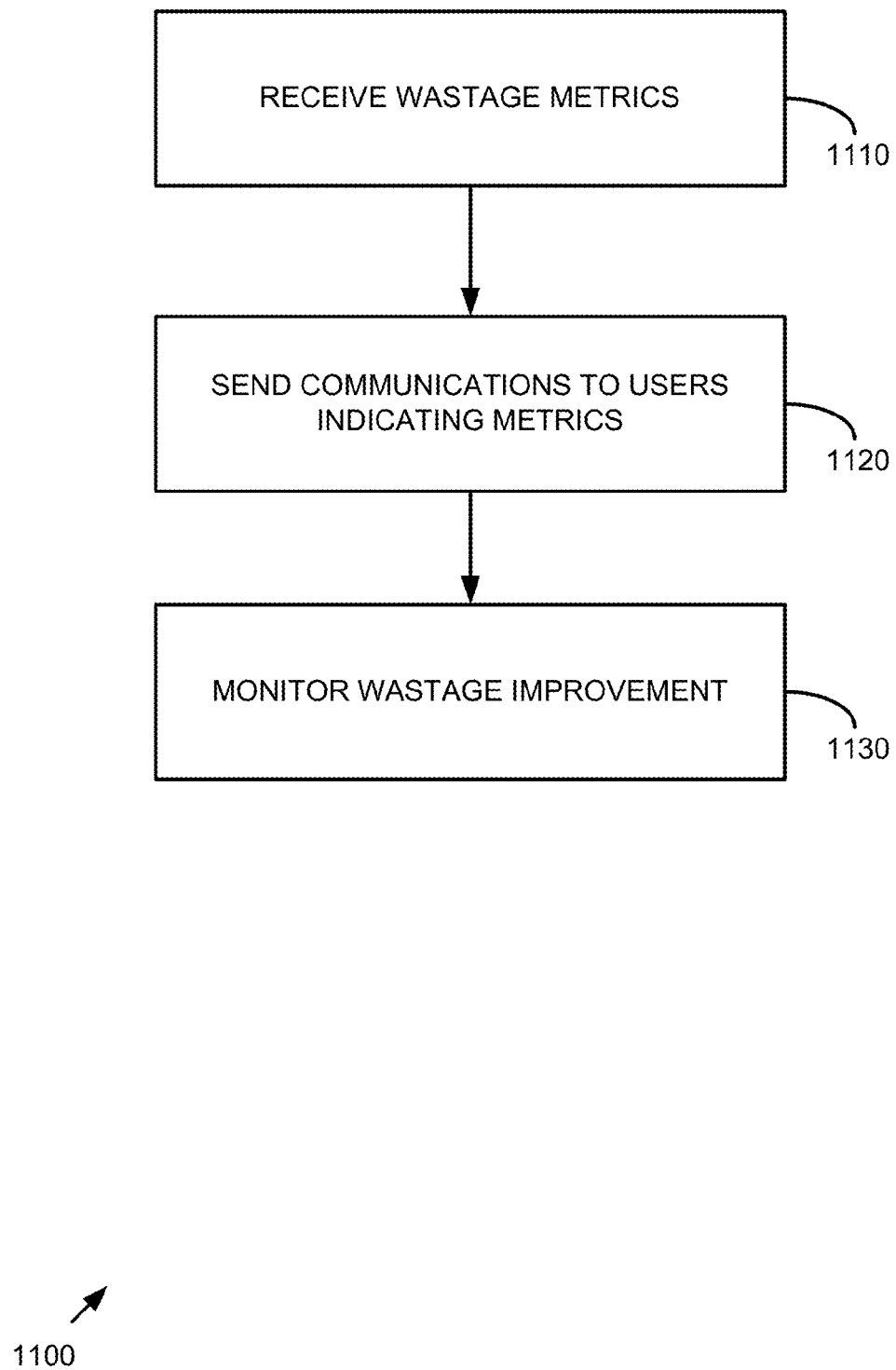
FIG. 11 is a flowchart of an exemplary method of encouraging improved user energy consumption behavior.

FIG. 11 is a flowchart of an exemplary method of encouraging improved user energy consumption behavior.

At 1110, energy wastage metrics are received by the system.

At 1120, communications are sent to users that include the metrics.

At 1130, wastage improvement is monitored. Positive behavior can be rewarded and the like.

Example 25

Exemplary Opt-out User Interface

Figure 12:
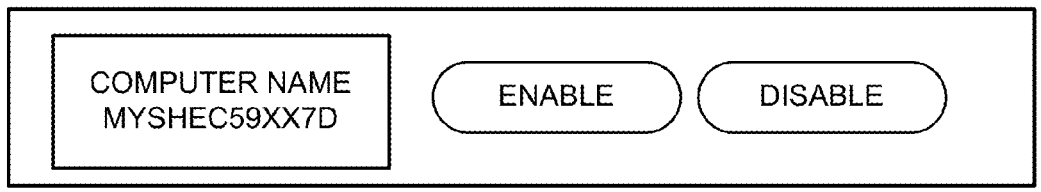
FIG. 12 is a screen shot of an exemplary user interface for opting out of an energy wastage management system.

FIG. 12 is a screen shot of an exemplary user interface 1200 for opting out of an energy wastage management system. In any of the examples herein, such a user interface can be used by which a user can opt out of the energy wastage management system. Energy wastage management of the node can thus be disabled.

For example, if a server computer must be left running overnight, or if a complex computation needs to run after a user leaves the facility, the user can opt out by selecting an option in the user interface 1200.

The energy wastage management system can ignore (e.g., disregard wastage for) hardware nodes that have opted out and/or indicate an opt-out condition (e.g., responsive to receiving an opt-out indication). Policies can be set so that opting out must be renewed after a predetermined period (e.g., a machine that opts out for 30 days).

Example 26

Exemplary Client User Interface

FIG. 13 is a screen shot of an exemplary client user interface 1300 of an energy wastage management system. The opt-out interface 1200 (e.g., one or more graphical buttons that can be used to enable or disable wastage energy wastage management of a hardware node) can be presented along with a graph showing the energy wasted (e.g., in units) and a summary of recent activity involving potential wastage.

An admin interface can also be accessed via the user interface.

The interface 1300 and any of the user interfaces herein can be presented via a method comprising acts of displaying the displayed user interface elements.

Example 27

Exemplary Wastage Presentation

FIG. 14 is a screen shot of an exemplary user interface 1400 displaying energy wastage data for a particular user. Energy units wasted as a function of time can be presented in a bar chart. In the example, monthly wastage is shown. Trends and averages can also be displayed as desired.

Example 28

Exemplary Chart Interface

FIG. 15 is an exemplary user interface 1500 displaying a chart of energy wastage activity details. In the example, ten (10) days' worth of detail is shown. In the example, the node is shown as having been left on with no shut downs.

In the data, it is assumed that the user leaves the system turned on before leaving the office premises for a period of 10 days. As seen above, considering the average working hours of the employee to be 10.75 hours, 10.22 units is wasted over a period of 10 days.

Example 29

Exemplary Admin Login Interface

Figure 16:
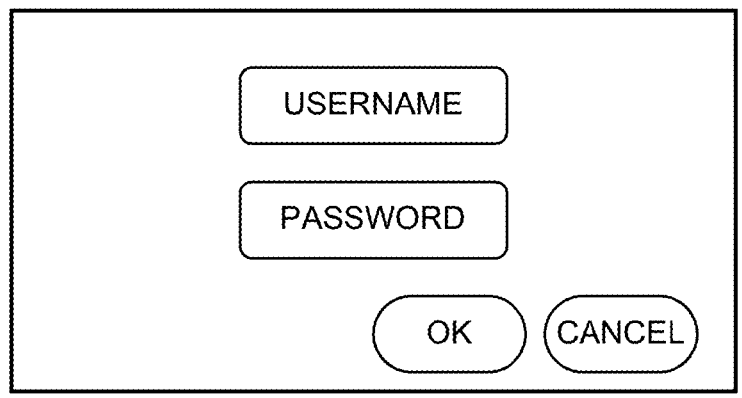
FIG. 16 is a screen shot of an exemplary user interface of an administrator login.

FIG. 16 is a screen shot of an exemplary user interface 1600 of an administrator login. A username and password are required to proceed.

Example 30

Exemplary Administrative Interface

FIG. 17 is a screen shot showing an exemplary administrator user interface 1700 for monitoring team, building, and campus level energy wastage and for setting energy wastage policies.

An administrator can further set policies by activating the user interface elements 1720, 1730.

Example 31

Exemplary Policy Interface

Figure 18:
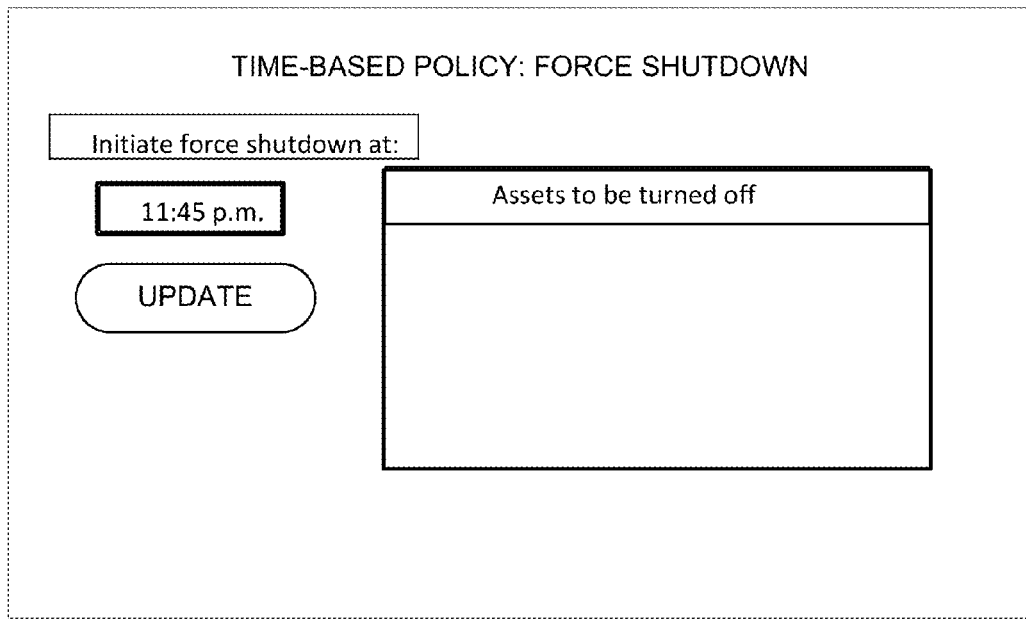
FIG. 18 is a screen shot showing an exemplary administrator user interface for setting a time-based policy to initiate forced shutdown of a node computer.

FIG. 18 is a screen shot showing an exemplary administrator user interface 1800 for setting a time-based policy to initiate forced shutdown of a node computer. In the example, a time-based policy can force shutdown of specified nodes after a particular time.

Example 32

Exemplary Policy Interface

Figure 19:
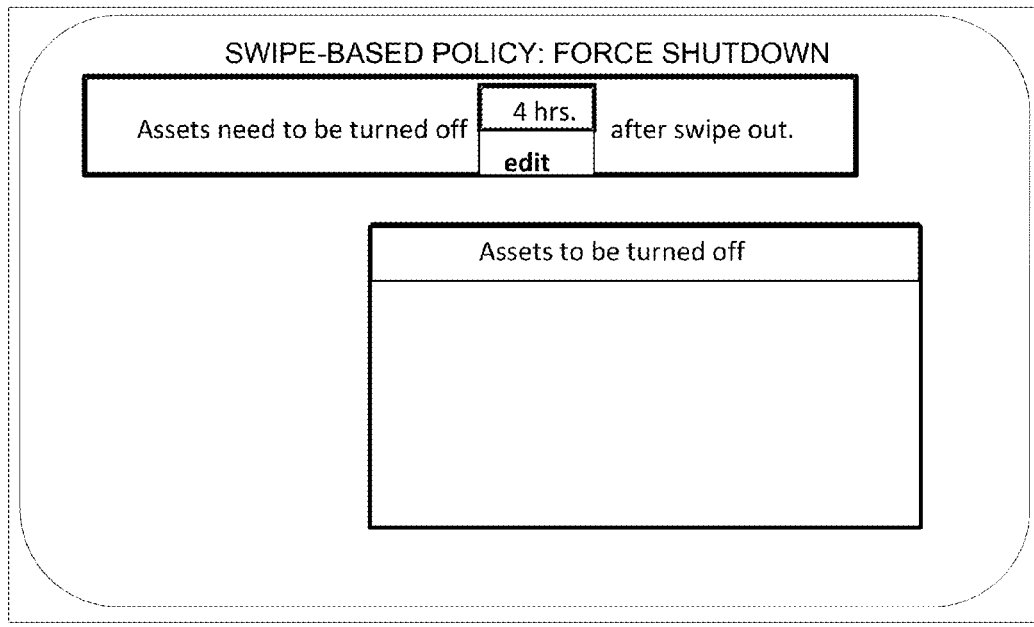
FIG. 19 is a screen shot showing an exemplary administrator user interface for setting a swipe-based policy to initiate forced shutdown based on attendance data.

FIG. 19 is a screen shot showing an exemplary administrator user interface 1900 for setting a swipe-based policy to initiate forced shutdown based on attendance data.

In the example, a swipe-based policy can force shutdown of specified nodes a certain time period after swipe out by the employee.

Example 33

Exemplary Further Information

The wastage server need not poll hardware nodes and swipe readers. And, the wastage server need not waste time polling hardware nodes that are shutdown (e.g., and therefore could not reply). Instead, hardware nodes can update the wastage engine on its past and current operational status periodically while operating or when restarted or awoken from sleep or other inactive states.

As described herein, communication from hardware nodes to the energy wastage engine can be delayed or batched to reduce impact on network traffic.

Example 34

Exemplary Non-Real-Time Operation

In any of the examples herein, power state information from some hardware nodes need not arrive not in real time at the wastage engine. For example, a high level of network traffic may make transmission of power state information undesirable, or a hardware node may be shutdown, in a sleep state, or in another inactive state.

As an example, a hardware node may normally send power state information before going inactive; however, this may be undesirable due to a high level of network traffic. To the extent that power state information is delayed, during the time interval of the delay, the wastage server need not provide information for the calculation of some wastage metrics. Still, the system can efficiently support non-real-time operation through several possible actions.

A lightweight client program running on a hardware node can push power state information to the wastage engine, either after that hardware node is again active and/or after network traffic reaches a reasonably low level.

For example, the wastage engine can still accurately calculate wastage metrics using the reported non-real-time information. For example, the wastage engine can then order inactivation of a hardware node, when policy dictates according to the correlated attendance data. And, for example, wastage statistics (e.g., incorporating metrics) made available to the user and for accumulation and reporting to management can still be accurately updated.

Policies can determine how and when wastage is actually calculated and assigned.

Example 35

Exemplary Further Information

The technologies herein can prevent energy wastage in computers by employees in an IT company and make them accountable for the energy they waste.

The action of sensors can be replicated using already-existing hardware. Hence, the need of sensors can be eliminated.

The technologies can work with 100,000 employees and 100,000 computers.

Assuming 10,000 computers are left on consuming 70 watt-hours (Wh) per CPU, and a monitor (TFT) consumes 20 Wh, and a Kilowatt-hour (kWh) costs 6 rupees (about $0.12).

Based on such assumptions, when 10,000 employees (e.g., working 10.75 hours during weekdays) fail to switch off their systems before leaving the premises, approximately 306,600 units which amounts to 1,839,600 rupees (about $37,000) wasted over a month.

A dashboard can show data acquired from swipe out and swipe in at the campus gate.

When a person swipes out of the gate without turning off the system, the energy consumed by the system is computed and added to the dashboard.

The first swipe-in and last swipe-out for the day is considered.

A program which indicates whether the computer is on or off runs on the systems. The data is monitored on a central server.

Example 36

Exemplary Features

The technologies herein can feature a user-centric dashboard; real time indicators of energy wastage can substitute for sensors. Hence making the system economical. The system can hold a user accountable for the energy wastage that the user is responsible for.

The system can employ an application that runs on respective nodes indicating the status of a node and having the capability to send accurate data to the central server even if the data transmission does not happen instantaneously.

The technologies need not cause network congestion during huge data processing.

Example 37

Exemplary Components

The technologies can include a graph of the data; details in a table; and a feature to indicate that the computer is kept on for a deliberate purpose.

Example 38

Exemplary Dashboard

A dashboard can include the following features:

An application that runs in the computer's background until the system is on will be used to monitor the computing of energy wastage.

Data acquired from swipe out and swipe in at the campus gate.

When a person swipes out of the gate without turning off the system, the energy consumed by the system is computed and added to the dashboard.

First swipe-in and last swipe-out for the day is considered.

Example 39

Exemplary Further Features

The client application can include the following features:

A timer that matches the time with that of the network.

The ability to send a response to the central server indicating the status of the system.

Timer is on only when the system is on and not during hibernation or sleep.

Puts the computer to hibernate when the computer is put to sleep.

Example 40

Exemplary Data Delay

When the data is not available in real time and there is a delay in obtaining the swipe data, the energy computation can still be done as the timer in the application can record the status of the system when the employee is out of the building.

In such scenarios, network clogging need not occur even though the data is huge because the data transmission to the central server can be done during the non-peak hours.

The delay in updating the dashboard can be proportional to the delay in getting the swipe data.

Example 41

Exemplary Actions

Actions can vary from different organizations, management, or even individuals based on their perspective of the issue:

Forcefully shutting down the system when not in use.

Penalizing the employee for the energy wastage the employee is responsible for.

Data considered as credit points which add up during appraisals (e.g., of an employee, manager, department, or the like).

Rewards and recognition for saving energy and hence resources of the company.

Make policies, guidelines, etc. based on the data to reduce the wastage of energy.

Example 42

Exemplary Advantages

The technologies may have any one or more of the following advantages:

Tracks the energy wastage during working hours also (e.g., over lunch).

Eliminates the need for sensors to provide the above data by substituting it with indicators of energy wastage.

The system will be effective in a long run and does not depend on the number of users in the organization.

Easy to implement and track the changes in the data.

Additional actions such as switching off the systems when not in use can be done more accurately as the data is current.

No manual intervention required to check the systems individually at the end of working hours.

It can be upgraded or modified based on the situations and data required at any point of time. Hence it is flexible.

Accountability of the energy wastage by the employee which can be tracked by the management.

Energy can be saved by employees whether they are environmentally conscious or not.

An economical and robust system can be implemented.

Example 43

Exemplary Shutdown Initiation

In any of the examples herein, shutdown can be initiated when an absent user leaves the computer on beyond a threshold amount of time. Such a threshold can be configurable according to a wastage policy rule (e.g., uniformly, at a department level, at the node level and/or user level if desired). For example, responsive to determining that the hardware node power state information and the user attendance information indicate that the hardware node has been left on unattended for over a threshold amount of time, shutdown of a node computer can be initiated.

Shutdown can be prevented if the wastage server determines that the user is no longer absent, if a different user is using the hardware node, or if an override or opt-out condition has been set.

Example 44

Exemplary Opt-Out Feature

In any of the examples herein, a user can opt out of energy wastage management. An exemplary user interface for opting out is shown in FIG. 12, and FIG. 13 shows an example of a client user interface in which the opt-out feature may be found.

Opting out sets an override condition for the hardware node, to avoid erroneous wastage calculations, hardware node shutdown, and the like.

Such a feature can be helpful when a user requires that a hardware node continue to run even when absent (e.g., when executing a lengthy process, for servers, or the like).

Example 45

Exemplary Computing Environment

The techniques and solutions described herein can be performed by software, hardware, or both of a computing environment, such as one or more computing devices. For example, computing devices include server computers, desktop computers, laptop computers, notebook computers, handheld devices, netbooks, tablet devices, mobile devices, PDAs, and other types of computing devices.

Figure 20:
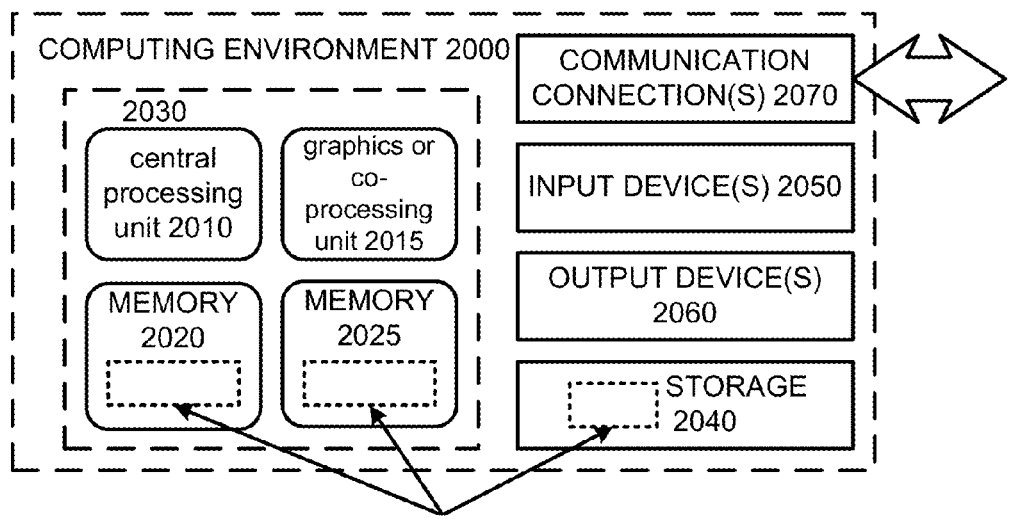
FIG. 20 is a block diagram of an exemplary computing environment suitable for implementing any of the technologies described herein.

FIG. 20 illustrates a generalized example of a suitable computing environment 2000 in which the described technologies can be implemented. The computing environment 2000 is not intended to suggest any limitation as to scope of use or functionality, as the technologies may be implemented in diverse general-purpose or special-purpose computing environments. For example, the disclosed technology may be implemented using a computing device comprising a processing unit, memory, and storage storing computer-executable instructions implementing the energy wastage management technologies described herein. The disclosed technology may also be implemented with other computer system configurations, including hand held devices, multi-processor systems, microprocessor-based or programmable consumer electronics, network PCs, minicomputers, mainframe computers, a collection of client/server systems, and the like. The disclosed technology may also be practiced in distributed computing environments where tasks are performed by remote processing devices that are linked through a communications network. In a distributed computing environment, program modules may be located in both local and remote memory storage devices.

With reference to FIG. 20, the computing environment 2000 includes at least one processing unit 2010 coupled to memory 2020. In FIG. 20, this basic configuration 2030 is included within a dashed line. The processing unit 2010 executes computer-executable instructions and may be a real or a virtual processor (e.g., executing on one or more hardware processors). In a multi-processing system, multiple processing units execute computer-executable instructions to increase processing power. The memory 2020 may be volatile memory (e.g., registers, cache, RAM), non-volatile memory (e.g., ROM, EEPROM, flash memory, etc.), or some combination of the two. The memory 2020 can store software 2080 implementing any of the technologies described herein.

A computing environment may have additional features. For example, the computing environment 2000 includes storage 2040, one or more input devices 2050, one or more output devices 2060, and one or more communication connections 2070. An interconnection mechanism (not shown) such as a bus, controller, or network interconnects the components of the computing environment 2000. Typically, operating system software (not shown) provides an operating environment for other software executing in the computing environment 2000, and coordinates activities of the components of the computing environment 2000.

The storage 2040 may be removable or non-removable, and includes magnetic disks, magnetic tapes or cassettes, CD-ROMs, CD-RWs, DVDs, or any other computer-readable media which can be used to store information and which can be accessed within the computing environment 2000. The storage 2040 can store software 2080 containing instructions for any of the technologies described herein.

The input device(s) 2050 may be a touch input device such as a keyboard, mouse, pen, or trackball, a voice input device, a scanning device, or another device that provides input to the computing environment 2000. For audio, the input device(s) 2050 may be a sound card or similar device that accepts audio input in analog or digital form, or a CD-ROM reader that provides audio samples to the computing environment. The output device(s) 2060 may be a display, printer, speaker, CD-writer, or another device that provides output from the computing environment 2000.

The communication connection(s) 2070 enable communication over a communication mechanism to another computing entity. The communication mechanism conveys information such as computer-executable instructions, audio/video or other information, or other data. By way of example, and not limitation, communication mechanisms include wired or wireless techniques implemented with an electrical, optical, RF, infrared, acoustic, or other carrier.

The techniques herein can be described in the general context of computer-executable instructions, such as those included in program modules, being executed in a computing environment on a target real or virtual processor. Generally, program modules include routines, programs, libraries, objects, classes, components, data structures, etc., that perform particular tasks or implement particular abstract data types. The functionality of the program modules may be combined or split between program modules as desired in various embodiments. Computer-executable instructions for program modules may be executed within a local or distributed computing environment.

Non-Transitory Computer-Readable Media

Any of the computer-readable media herein can be non-transitory (e.g., memory, magnetic storage, optical storage, or the like).

Storing in Computer-Readable Media

Any of the storing actions described herein can be implemented by storing in one or more computer-readable media (e.g., computer-readable storage media or other tangible media).

Any of the things described as stored can be stored in one or more computer-readable media (e.g., computer-readable storage media or other tangible media).

Methods in Computer-Readable Media

Any of the methods described herein can be implemented by computer-executable instructions in (e.g., encoded on) one or more computer-readable media (e.g., computer-readable storage media or other tangible media). Such instructions can cause a computer to perform the method. The technologies described herein can be implemented in a variety of programming languages.

Methods in Computer-Readable Storage Devices

Any of the methods described herein can be implemented by computer-executable instructions stored in one or more computer-readable storage devices (e.g., memory, magnetic storage, optical storage, or the like). Such instructions can cause a computer to perform the method.

Alternatives

The technologies from any example can be combined with the technologies described in any one or more of the other examples. In view of the many possible embodiments to which the principles of the disclosed technology may be applied, it should be recognized that the illustrated embodiments are examples of the disclosed technology and should not be taken as a limitation on the scope of the disclosed technology. Rather, the scope of the disclosed technology includes what is covered by the following claims. I therefore claim as my invention all that comes within the scope and spirit of the claims.

I claim:

1. A method implemented at least in part by a computer, the method comprising:
    receiving hardware node power state information in the form of logs recorded by respective hardware nodes, wherein the hardware node power state information comprises at least one record indicating a hardware user identifier, a timestamp, and a power on indication for a hardware node;
    receiving user attendance information for a plurality of users, wherein the attendance information comprises at least one user attendance record indicating an attendance user identifier, a timestamp, and an in-or-out indication, wherein an arrival time and a departure time of a user for a particular day is indicated;
    via correlation, identifying the arrival time of the user and the departure time of the user for the particular day and that the hardware node was left powered on when the user was absent for a certain period of time, wherein the correlation comprises correlating the attendance user identifier with the hardware user identifier;
    responsive to determining that the hardware node power state information and the attendance information indicate that the hardware node has been left on by the absent user for over a threshold amount of time, initiating shutdown of the hardware node; and
    based on the hardware node power state information and the user attendance information, calculating an energy wastage metric for the user.

2. The method of claim 1 further comprising:
    correlating the user with the hardware node; and
    determining an amount of time when the hardware node was left on and the user was absent;
    wherein calculating the energy wastage metric for the user comprises incorporating the amount of time when the hardware node was left on and the user was absent as wastage.

3. The method of claim 1 further comprising:
    displaying a visual depiction incorporating the energy wastage metric for the user.

4. The method of claim 1 further comprising:
    collecting ongoing attendance information for a plurality of users; and
    batching the ongoing attendance information together.

5. The method of claim 1 wherein:
    receiving the user attendance information comprises receiving batched information for a plurality of users having entered or departed a facility over an observed time period.

6. The method of claim 5, wherein the user attendance information originates from an entryway swipe reader.

7. The method of claim 1, further comprising receiving an opt-out indication from the hardware node; and responsive to receiving the opt-out indication, disregarding energy wastage for the hardware node.

8. The method of claim 1 further comprising:
    deferring transmission of the user attendance information until network conditions are light; and
    responsive to determining that network conditions are light, transmitting the user attendance information.

9. The method of claim 8 wherein:
    deferring is performed by a time-and-attendance system.

10. The method of claim 1 further comprising:
    receiving a manual entry of at least some of the user attendance information.

11. The method of claim 1 wherein:
    indication of a time and power state for a hardware node originates from a program executing at the hardware node.

12. The method of claim 1, further comprising assigning a penalty, a credit, or a reward to the user based on the energy wastage metric.

13. A system comprising:
    one or more processors;
    one or more non-transitory computer-readable devices;
    a hardware node power state information collector configured to collect hardware node power state information for hardware nodes in the form of logs recorded by respective hardware nodes, wherein the hardware node power state information comprises at least one record indicating a user identifier, a timestamp, and a power on indication for a particular hardware node;
    an attendance information collector configured to collect attendance data for employees on a batched basis, wherein the attendance data comprises at least one employee attendance record indicating an employee identifier, a timestamp, and an in-or-out indication, wherein an arrival time and a departure time of an employee for a particular day is indicated;
    and
    a wastage engine configured to accept the hardware node power state information and the attendance data and output wastage results based on periods during which the hardware nodes are powered on and the employees are absent;
    wherein the wastage engine is further configured to:
        via correlation, identifying the arrival time of the employee and the departure time of the employee for the particular day and that the particular hardware node was left powered on when the employee was absent for a certain period of time, wherein the correlation comprises correlating the employee identifier with the user identifier; and
    responsive to determining that the hardware node power state information and the attendance data indicate that the particular hardware node has been left on by the absent employee for over a threshold amount of time, initiating shutdown of the particular hardware node.

14. One or more non-transitory computer-readable storage devices comprising computer-executable instructions causing a computing device to perform a method comprising:
    receiving a batch of employee attendance information for a plurality of employees, wherein the attendance information comprises at least one employee attendance record indicating an employee identifier, a timestamp, and an in-or-out indication, wherein an arrival time and a departure time of an employee for a particular day is indicated;
    receiving hardware node power state information in the form of logs recorded by respective hardware nodes, wherein the hardware node power state information comprises at least one record indicating a user identifier, a timestamp, and a power on indication for a particular hardware node;

via correlation, identifying the arrival time of the employee and the departure time of the employee for the particular day and that the particular hardware node was left powered on when the employee was absent for a certain period of time, wherein the correlation comprises correlating the employee identifier with the user identifier; and responsive to determining that the hardware node power state information and the attendance information indicate that the particular hardware node has been left on by the absent employee over a threshold amount of time, initiating shutdown of the particular hardware node.

15. The one or more non-transitory computer-readable storage devices of claim 14 wherein the method further comprises:

based on the certain period of time, calculating an amount of energy wasted for the employee; and displaying a graphical representation incorporating the amount of energy wasted.

* * * * *